(12) United States Patent
Solomon (10) Patent No.: US 12,505,244 B1
(45) Date of Patent: Dec. 23, 2025

(54) CATEGORIZING POLICY-BASED CONTROL MAPPING FOR REAL-TIME SECURITY AND COMPLIANCE MONITORING

(71) Applicant: DRATA INC., San Diego, CA (US)

(72) Inventor: Lior Solomon, Haworth, NJ (US)

(73) Assignee: DRATA INC., San Diego, CA (US)

( * ) Notice: Subject to any disclaimer, the term of this patent is extended or adjusted under 35 U.S.C. 154(b) by 70 days.

(21) Appl. No.: 18/677,816

(22) Filed: May 29, 2024

(51) Int. Cl.
*G06F 21/62* (2013.01)
*G06Q 10/0635* (2023.01)

(52) U.S. Cl.
CPC ..... *G06F 21/6218* (2013.01); *G06Q 10/0635* (2013.01)

(58) Field of Classification Search
CPC .............. G06F 21/6218; G06Q 10/0635
See application file for complete search history.

(56) References Cited

U.S. PATENT DOCUMENTS

| | | | |
|---|---|---|---|
| 7,536,456 B2 * | 5/2009 | Williams | H04L 63/14 709/224 |
| 10,205,593 B2 * | 2/2019 | Biesinger | H04L 9/0861 |
| 2007/0180490 A1 * | 8/2007 | Renzi | G06F 21/604 726/1 |
| 2025/0131093 A1 * | 4/2025 | Sharieh | G06V 30/414 |

* cited by examiner

*Primary Examiner* — Han Yang (57) ABSTRACT

Categorizing policy-based control mapping for real-time security and compliance monitoring including receiving, by a security and compliance monitor, a request for a control mapping score indicating an affinity between a user-generated policy document and a proposed control, wherein the proposed control is a measurable component exposed by a services provider of an organization, and wherein the proposed control is intended to indicate a level of compliance of the organization with the user-generated policy document; determining, by the security and compliance monitor from a group of template policy documents, a best-matching template policy document for the user-generated policy document; generating, by the security and compliance monitor, the control mapping score based on previous mappings between the proposed control and the best-matching template policy document; and providing, by the security and compliance monitor to a user computing system, the control mapping score for the proposed control mapped to the user-generated policy document.

20 Claims, 7 Drawing Sheets

CATEGORIZING POLICY-BASED CONTROL MAPPING FOR REAL-TIME SECURITY AND COMPLIANCE MONITORING

DESCRIPTION OF EMBODIMENTS

Many businesses employ external service providers to perform various aspects of the business's operations. At the same time, businesses are increasingly subject to regulations and standards that require specific procedures to be followed and documented. As businesses continue to expand utilization of cloud-based systems and services, the need for monitoring the security, privacy, and confidentiality of data that passes through or is stored on the third-party systems and services also increases.

Figure 1:
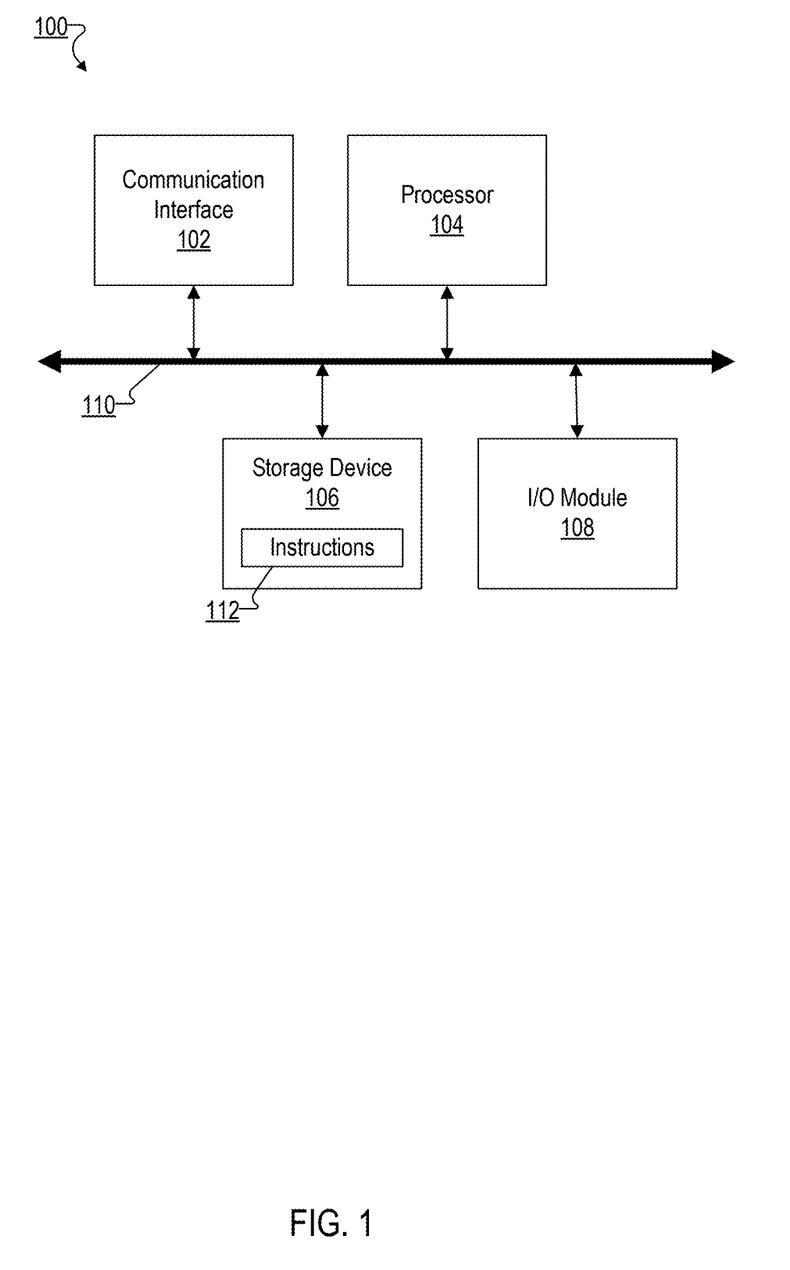
FIG. 1 illustrates an example computing device for security and compliance monitoring in accordance with some implementations.

Example methods, apparatus, and products for categorizing policy-based control mapping for real-time security and compliance monitoring in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
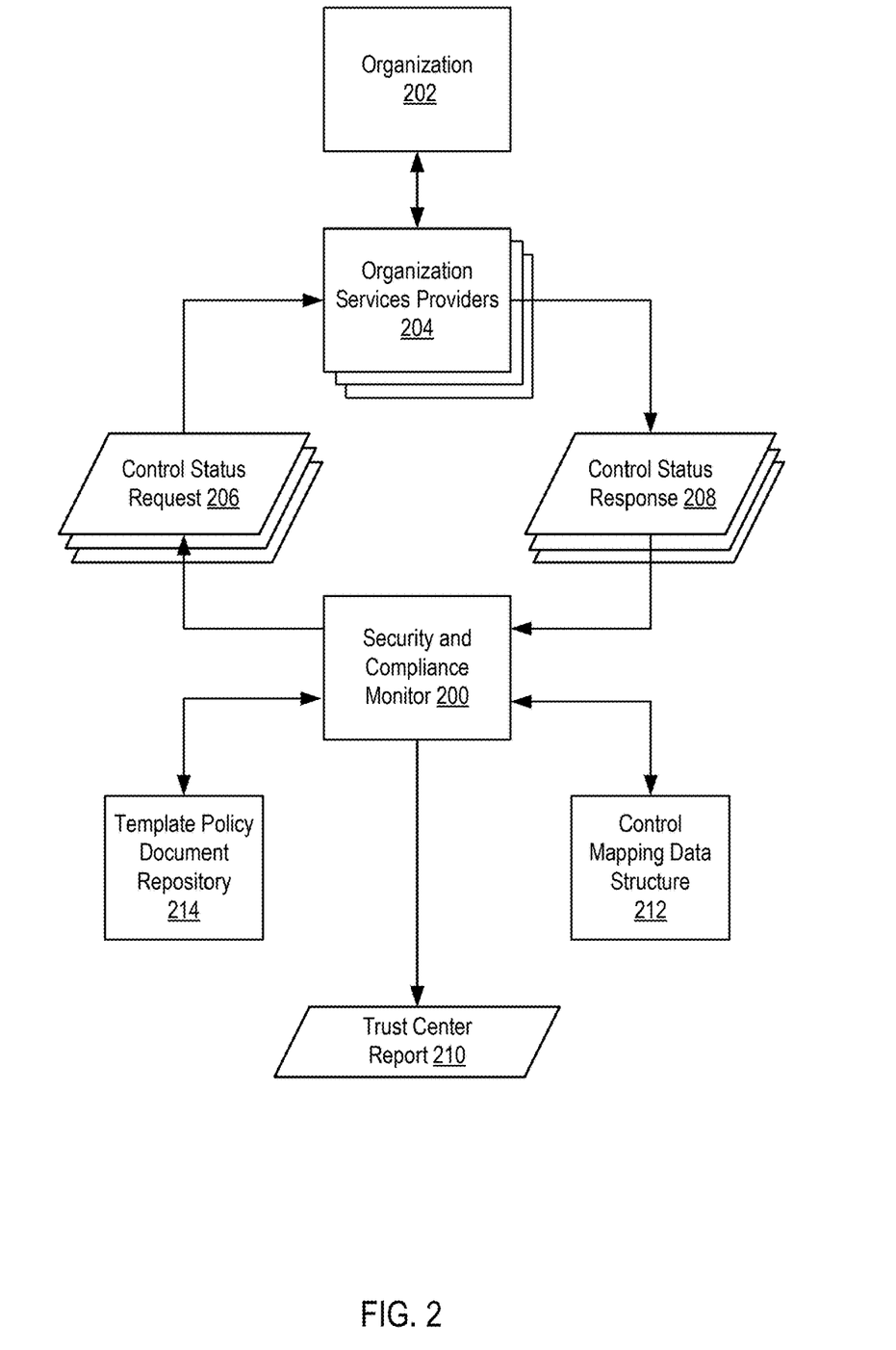
FIG. 2 illustrates an example system for security and compliance monitoring in accordance with some implementations.

For further explanation, FIG. 2 illustrates an exemplary block diagram depicting a system for security and compliance monitoring in accordance with some embodiments of the present disclosure. The system of FIG. 2 includes a security and compliance monitor 200, an organization 202, multiple organization services providers 204, a template policy document repository 214, and a control mapping data structure 212. The security and compliance monitor 200 issues control status requests 206 to the organization services providers 204 and, in response, receives the control status responses 208. The security and compliance monitor 200 also uses the control status responses 208 to generate the trust center report 210.

Each element presented may be hosted by, or be comprised of, one or more computing systems (not shown). Specifically, the security and compliance monitor 200 may be hosted by one or more security and compliance monitor computing systems (which may also host the template policy document repository 214 and the control mapping data structure 212), the organization 202 may include multiple organization computing systems, and each organization services provider 204 may be hosted by one or more cloud-based services provider computing systems.

The security and compliance monitor 200 is hardware, software, or an aggregation of hardware and software configured to determine a degree to which an organization 202 is complying with a particular security and compliance policy. Specifically, the security and compliance monitor 200 monitors a set of controls for service providers that support the organization 202. Each control monitored by the security and compliance monitor 200 is associated with at least one element of a security and compliance policy. The security and compliance monitor 200 uses the status of each control to compile the trust center report 210 detailing the compliance status of the organization 202 with regard to the security and compliance policy.

The organization 202 is an entity that utilizes the services provided by the organization services providers 204. The organization 202 may be an organization that itself provides a service or product to other clients utilizing the collection of services supplied by the organization services providers 204. For example, the organization 202 may be a software developer that utilizes cloud-based services including cloud-based storage, cloud-based development tools, cloud-based ticketing, and cloud-based human resources.

The organization 202 may be a "cloud-native" organization that creates products using cloud-based services providers. The organization 202 may be "cloud-first" and exclusively utilize computing resources, applications, and systems provided by organization services providers 204 for some or all aspects of the organization. Regardless of the level of reliance on organization services providers 204, in order to be in full compliance with any legally- or operationally-required policies and frameworks, the organization 202 must verify that each organization services providers 204 is operating in a manner consistent with those policies.

The organization services providers 204 are entities that supply a resource or product to the organization 202 over a wide-area network. Each organization services providers 204 may be a cloud-based services provider and include a collection of computer systems working in concert to provide the resource or product over the Internet (examples of which are described below in reference to FIG. 3). In addition to providing the resource or product, each organization services providers 204 also exposes an interface allowing the security and compliance monitor 200 to retrieve control statuses from the organization services providers 204.

The organization 202 may utilize other services that are not cloud-based services (relative to the organization 202). Specifically, the organization 202 may include services (e.g., enterprise productivity suites, virtualization software, etc.) provided by other entities and hosted on computing systems under the control of organization 202 (i.e., not on a separate services provider system). For such services, the security and compliance monitor 200 sends the control status requests 206 to the computing systems of the organization 202 instead of a third-party computing system.

As discussed above, the organization 202 is an entity obligated to abide by security and compliance policies (including standards frameworks) for legal and/or business purposes. A security and compliance policy is a group of assurances and procedures related to the manner in which an organization conducts its operation. A standards framework (also referred to as a security and compliance framework) defines procedures that must be followed, tracked, and documented in order to comply with the particular law or standard around which the framework has been constructed. Many policies and standards frameworks describe the manner in which customer or employee data must be managed. Other policies and standards frameworks describe the disclosure or training obligations to employees or customers. A policy document is data storing a security and compliance policy, such as a text file.

The security and compliance monitor 200 maintains a set of security and compliance polices that include both standards frameworks and template policies. A template policy is a security and compliance policy that includes standard, common, and/or general obligations related to the policy purpose. Examples of template policies include privacy policies, data governance policies, and cyber security policies. The standards frameworks may include, for example, a System and Organization Controls (SOC) framework, an International Organization for Standardization (ISO) framework, a Health Insurance Portability and Accountability Act (HIPAA) framework, a General Data Protection Regulation (GDPR) framework, a Sarbanes-Oxley Act (SOX) framework, a Payment Card Industry Data Security Standard (PCI DSS) framework, and a California Consumer Privacy Act (CCPA) framework. Template policies are stored in the template policy document repository 214. The template policy document repository 214 is memory and a data structure for storing the template policy documents.

Each security and compliance policy may be composed of human-readable text detailing the obligations of the entity to be in compliance with the policy. Each obligation may be tracked using a control. A control is a measurable component exposed by a services provider. For example, one obligation of a policy may dictate that, when stored, user data must be encrypted using a specified minimum standard. This obligation may be tracked using two controls: a first control may be whether or not the user data is encrypted and a second control may be the level of encryption employed.

A control status is the state of the control retrieved from the services provider (e.g., organization services providers 204). The control status may be a Boolean response (i.e., true or false), a selection from a group (e.g., low, medium, or high), or some other form of data. The control status is retrieved from the services provider using a control status request and control status response. Obtaining the control statuses may be performed using control status requests 206 and control status responses 208. A control status request 206 is a message targeting a particular services provider 204 requesting information about a control. The control status request 206 may include code that instructs the particular services provider 204 to generate a control status response 208. A control status response 208 is a message that describes the state of a particular control within the services provider 204. The control status responses 208 may be in the form of a state specification. A state specification is a collection of data that conveys data objects from one system to another. The state specification may be a standard file format used to exchange data in asynchronous browser-server communication. For example, the state specification may be a JavaScript Object Notation specification.

The control mapping data structure 212 is a data structure that contains data describing associations between template policy documents and controls. Specifically, the control mapping data structure 212 maps each template policy document to a group of controls that users have employed to monitor compliance with that particular template policy. The control mapping data structure 212 also includes an indication of the number of times each control has been employed to monitor compliance with that particular template policy. For example, each entry may include a template policy identifier and a group of control identifiers, each with an indicator signifying a frequency that the particular control has been previously used monitor compliance with the template policy. The indicator may be relative to other controls. For example, the indicator may be "high" (indicating very frequently mapped), "medium" (indicating somewhat frequently mapped), "low" (indicating an infrequent mapping), or "rarely" (indicating zero or very few previous mappings). Alternatively, the indicator may be an absolute value of the number of times the control has been previously used monitor compliance with the template policy. The frequency may be over a unit of time (e.g., the previous 12 months) or over a unit of mappings for the policy (e.g., across all previous mapping, across the previous 10,000 mappings).

The trust center report 210 is a collection of control statuses that correspond to the obligations of a particular security and compliance policy. The trust center report 210 conveys the compliance state of the organization with regard to the particular security and compliance policy. The trust center report 210 may be provided in response to a request by an auditor or organization client. Further, the trust center report 210 may be generated in response to regulatory obligations or as a condition of a particular business agreement.

Figure 3:
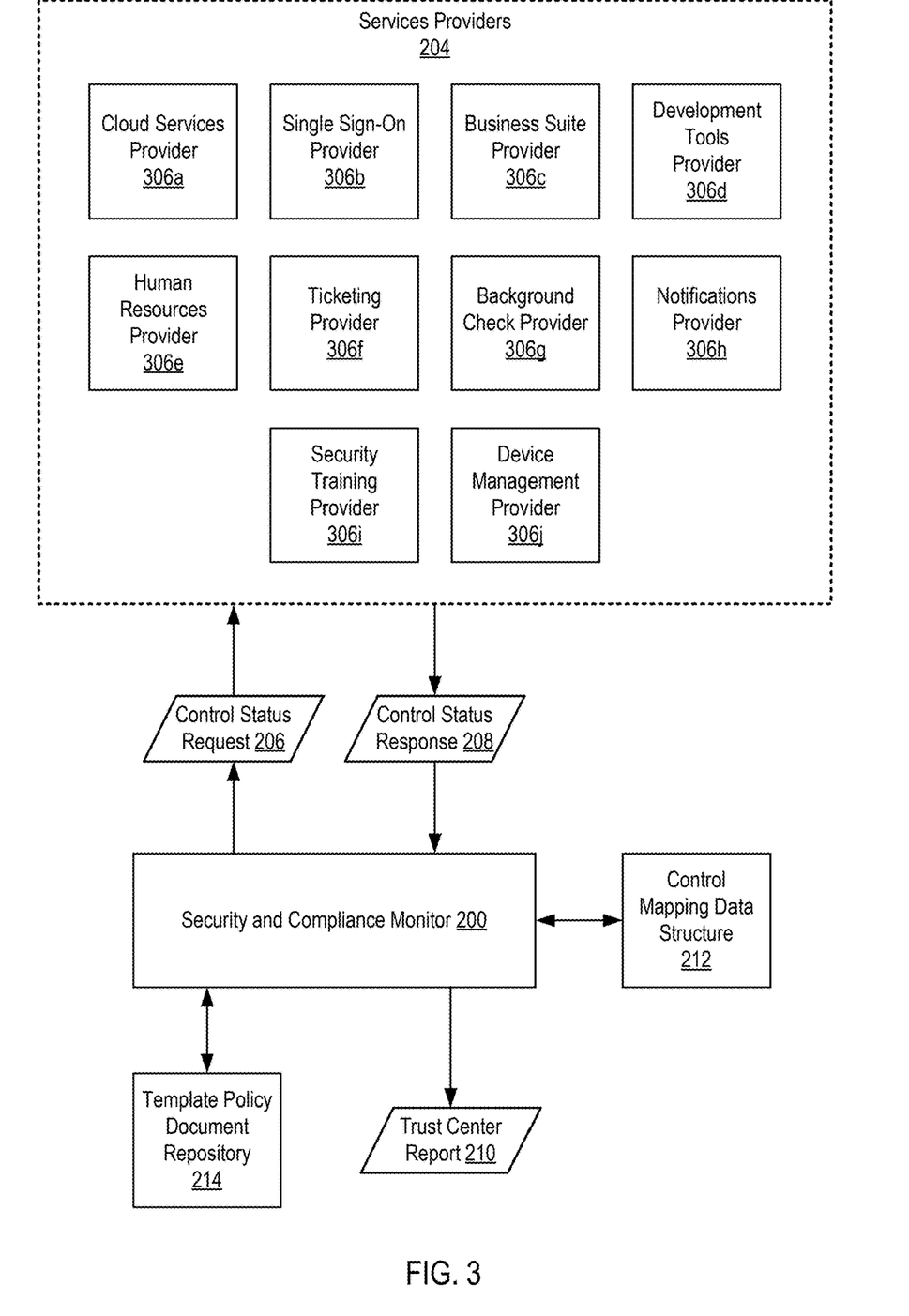
FIG. 3 illustrates an example system for security and compliance monitoring in accordance with some implementations.

For further explanation, FIG. 3 illustrates an exemplary block diagram depicting a system for security and compliance monitoring in accordance with some embodiments of the present disclosure. Specifically, the system of FIG. 3 includes details of the interactions between the security and compliance monitor 200 and service providers 204. FIG. 3 also shows example services providers 204 from which control statuses are retrieved.

The services providers 204 in FIG. 3 include a cloud services provider 306a, a single sign-on provider 306b, business suite provider 306c, a development tools provider 306d, a human resources provider 306e, a ticketing provider 306f, a background check provider 306g, a notifications provider 306h, a security training provider 306i, and a device management provider 306j.

A cloud services provider 306a is a supplier of a cloud-based platform, infrastructure, application or storage services. Examples of controls for cloud services providers 306a include frequency of data backups, level of data security, and location of stored data. A single sign-on provider 306b is a supplier of authentication across multiple third-party applications. Examples of controls for single sign-on providers include access controls, level of access for each user, and role-level security. A business suite provider 306c is a supplier of business applications for communications and data operations across and within businesses. Examples of controls for business suite providers include customer data handling, data access controls, and communications data security. A development tools provider 306d is a supplier of applications that allow developers to create, test and debug software. Examples of controls for development tools providers include customer data handling, best practices implementations, and data access controls.

A human resources provider 306e is a supplier of employee management software and services. Examples of controls for human resources providers include employee data security and employee safety metrics. A ticketing provider 306f is a supplier of applications and services for addressing information technology issues. Examples of controls for ticketing providers include data access controls, employee data security, and customer data security. A background check provider 306g is a supplier of services to review potential employee's criminal, commercial and financial records. Examples of controls for background check providers include employee data security and potential employee data security. A notifications provider 306h is a supplier of communications applications for an enterprise environment. Examples of controls for notifications providers include employee data security and communications data security. A security training provider 306i is a supplier of training systems for enterprise employees. Examples of controls for security training providers include training completion level for each employee, and employee data security. A device management provider 306j is a supplier of services that control data, configuration settings and applications on all devices used within an enterprise. Examples of controls for device management providers include device security, device access controls, and employee data security. As discussed above, the services providers may include services that are not cloud-based services.

In order to instill confidence in their clients, an organization may provide a trust center report 210. A trust center report 210 is a presentation of information about an organization's practices, policies, and procedures on privacy, security, transparency, and compliance. An automated trust center is a trust center report 210 in which the status of the controls that make up the trust center are retrieved and updated automatically (e.g., by a security and compliance monitor 200). An automated trust center that provides real-time security and compliance monitoring is a trust center that reflects the current status of each control with minimal delay for retrieval and/or based on a service level agreement.

Figure 4:
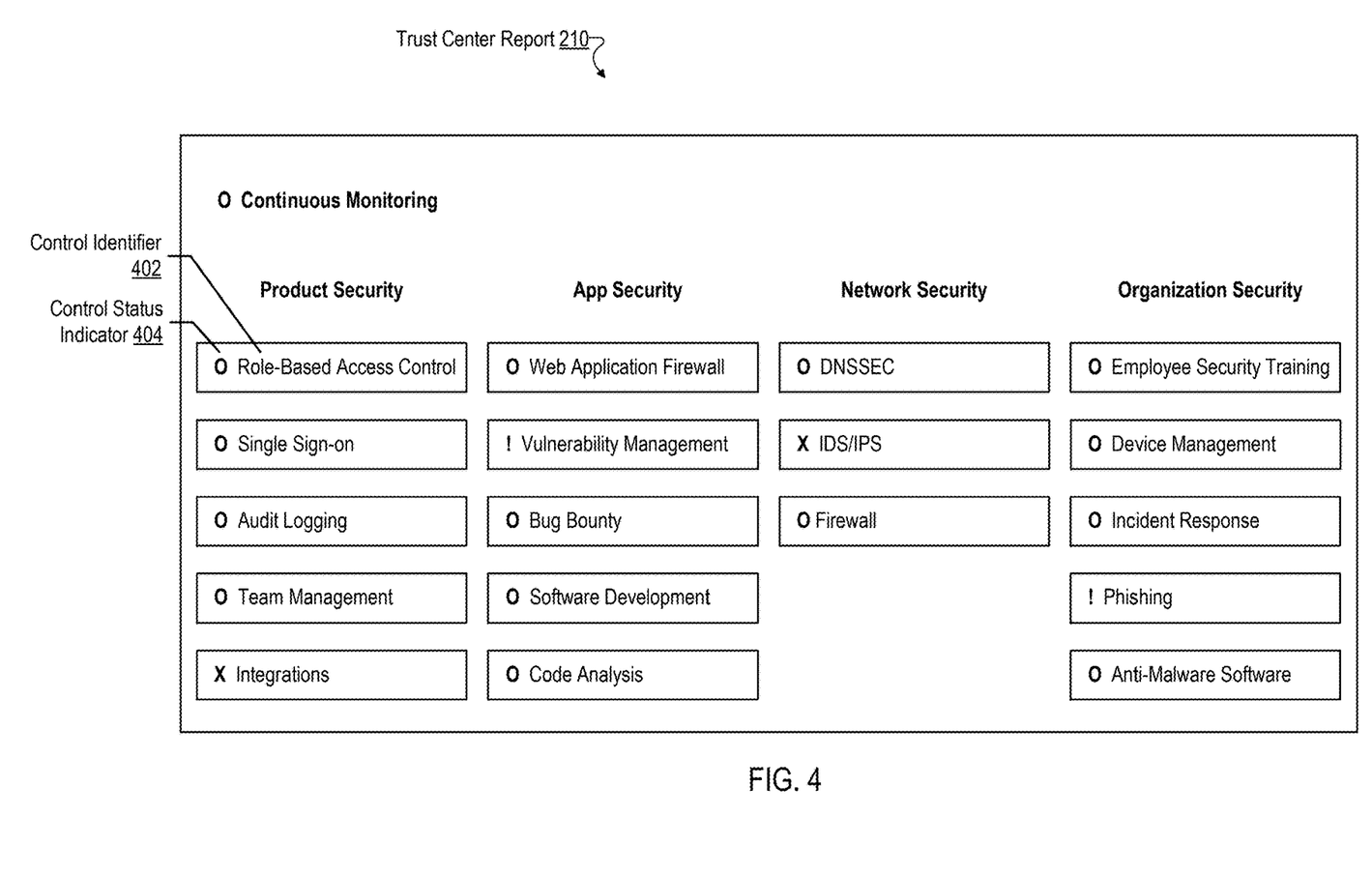
FIG. 4 illustrates an example trust center report in accordance with some implementations.

For further explanation, FIG. 4 illustrates an exemplary trust center report 210 in accordance with some embodiments of the present disclosure. As discussed above, a trust center report 210 is a collection of control statuses for controls selected for the trust center. The trust center controls may be selected as those of particular interest to organization clients. Alternatively, or additionally, the trust center controls may be selected from a widely-used standards framework. The trust center report 210 may be embodied as a dynamic webpage retrievable via a link within the organization's domain. Although appearing to be part of the organization's website, when requested, some or all of the webpage may be retrieved from the security and compliance monitor.

As shown in FIG. 4, the trust center report 210 presents controls and the associated control statuses retrieved by the security and compliance monitor. The trust center report 210 includes a control identifier 402 for each control and a control status indicator 404 that displays a symbol to signify the status of the associated control. Specifically, a control status indicator 404 of "O" indicates that the control is in compliance, a control status indicator 404 of "!" indicates that the control is out of compliance but not yet failing, and a control status indicator 404 of "X" indicates that the control is failing. The amount of time before a failed test for a control renders that control to be out-of-compliance may be set by the organization via a service level agreement (SLA) with the security and compliance monitor, based on the compliance standard itself, set by the platform globally for all organization's trust center, or set by the platform for the entity based on a variety of factors of the organization (organization size, type of organization, business segment of the organization, age of the organization, and so on). The security and compliance monitor, when hosting trust centers for organizations, may enable an organization to customize the trust center for branding purposes.

In some implementations, clicking on any of these controls may provide various information to a user of the trust center report 210. For example, clicking on an anti-DDOS control may provide a user with the various protocols or hardware in place to rebuff such DDOS attacks. The trust center report 210 may also provide evidence of the monitoring when a control is clicked on. That is, when clicking on, for example, "Single Sign On," not only might trust center provide details regarding the IDP utilized by the entity to provide single sign on, but also the date, time, and specifics of a recent test of the entities IDP in practice.

While particular combinations of various functions and features of the one or more embodiments are expressly described herein, other combinations of these features and functions are likewise possible. The present disclosure is not limited by the particular examples disclosed herein and expressly incorporates these other combinations.

Figure 5:
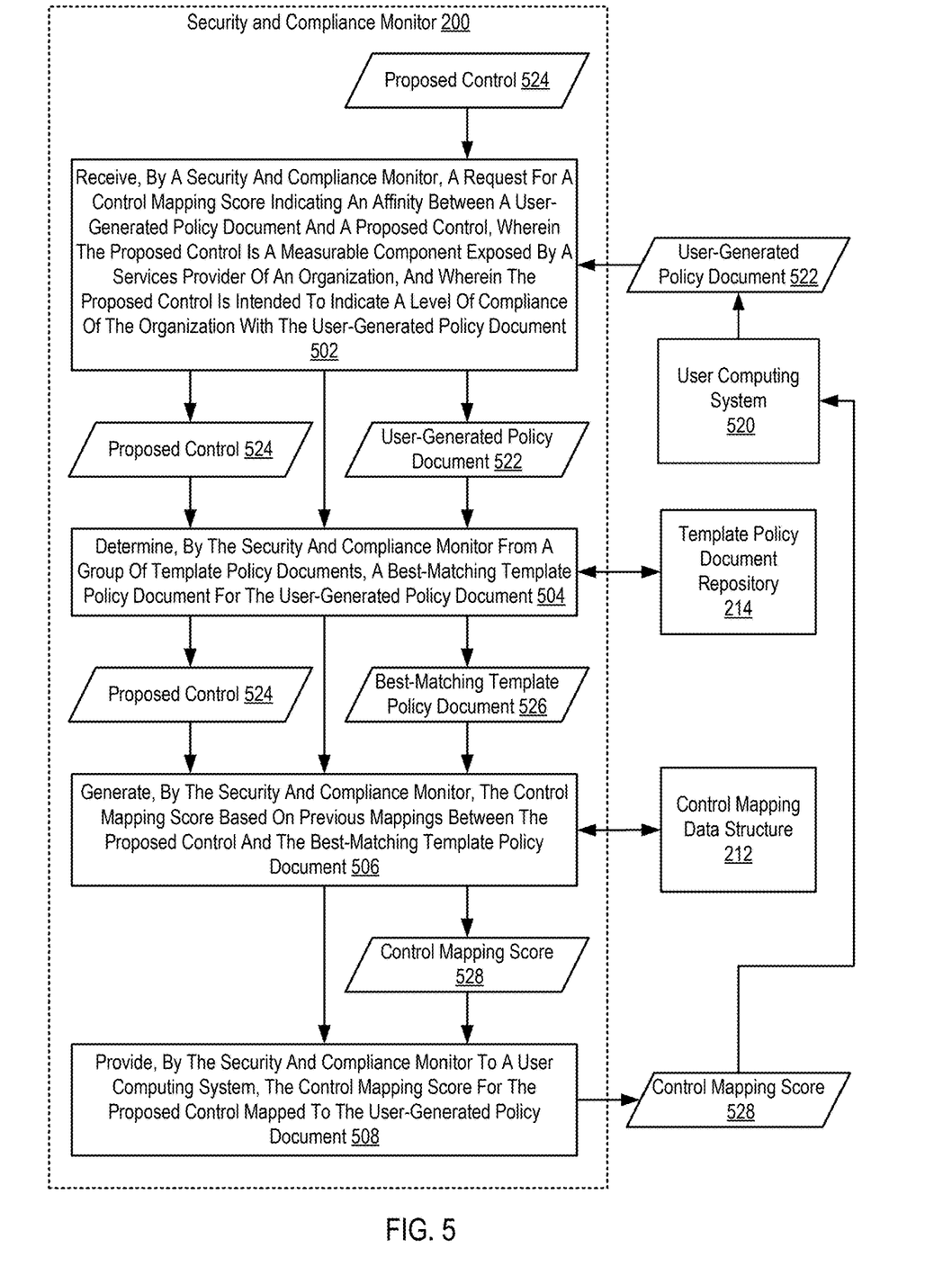
FIG. 5 sets forth a flow chart illustrating an exemplary method for categorizing policy-based control mapping for real-time security and compliance monitoring according to embodiments of the present invention.

For further explanation, FIG. 5 sets forth a flow chart illustrating an exemplary method for a categorizing policy-based control mapping for real-time security and compliance monitoring according to embodiments of the present invention. Although depicted in less detail, the system may include some or all of the components described above. The example method depicted in FIG. 5 may be used to evaluate a mapping between a template policy document and a particular control. Specifically, the security and compliance monitor 200 may have determined a control that best-matches an excerpt from a user-generated policy document. The following method may be used to determine the likelihood that the determined control is appropriate to recommend for use.

The method of FIG. 5 includes receiving 502, by a security and compliance monitor 200, a request for a control mapping score indicating an affinity between a user-generated policy document 522 and a proposed control 524, wherein the proposed control 524 is a measurable component exposed by a services provider of an organization, and wherein the proposed control 524 is intended to indicate a level of compliance of the organization with the user-generated policy document 522. Receiving 502 the request for a control mapping score indicating an affinity between a user-generated policy document 522 and a proposed control 524 may be carried out by the security and compliance monitor 200 accessing both the user-generated policy document 522 and the proposed control 524. The user-generated policy document 522 may have been uploaded by a user of the user computing system 520 to the security and compliance monitor 200. The data comprising the user-generated policy document 522 may be received by the security and compliance monitor 200 as a data file storing the text of the user-generated policy. Alternatively, the text of the user-generated policy from within the user-generated policy document 522 may be entered into a text field on a form presented by security and compliance monitor 200.

The user-generated policy document 522 is data that includes a policy in force (or planning to be in force) by an organization. Further, the user-generated policy document 522 is a policy document and policy that the security and compliance monitor 200 has not yet encountered. Specifically, the user-generated policy document 522 includes a policy that is not included in the security and compliance policies accessible by the security and compliance monitor 200. The user-generated policy document 522 may include a policy that was drafted specifically for the particular organization and has been implemented by that organization. The user-generated policy document 522 may be, for example, a privacy policy, data governance, HR policy, or any other policy in force (or planning to be in force) by the organization. The user computing system 520 is a computing system under the control of a user working on behalf of the organization.

The user-generated policy document 522 includes descriptions of controls that indicate a level of compliance with the user-generated policy document 522. Specifically, the user-generated policy document 522 includes descriptions of obligations an organization has committed to fulfilling. For example, the user-generated policy document 522 may recite that "user data is encrypted using military grade encryption techniques". Although the specific controls may not be explicit within the text of the user-generated policy document 522, the obligations described in the user-generated policy document 522 are mapped to controls by the security and compliance monitor 200. The proposed control 524 is one such control selected to determine whether an organization is complying with a specific portion of the user-generated policy document 522. The control is "proposed" in that recommending or employing the control for the user-generated policy document 522 may be pending a control mapping score for the proposed control 524. The proposed control 524 may include a control identifier.

The proposed control 524 may be identified by the security and compliance monitor 200 during a previous process. For example, the proposed control may have been identified by matching language within the user-generated policy document 522 to a stock control language record describing the proposed control 524. This process may include submitting the user-generated policy document 522 to a large language model system with instructions to extract language that describes potential controls for the user-generated policy document 522. The extracted language may then be compared to stock language control records using, for example, a vector database and a similarity search. The stock language control record that best matches the extract language may be used to select the proposed control 524.

The control mapping score 528 is an indication of an affinity between a user-generated policy document 522c and a proposed control 524. Specifically, the control mapping score 528 indicates the likelihood that the proposed control 524 addresses the associated obligation within the user-generated policy document 522 based on historical data. The control mapping score 528 may be numerical value that indicates the relative strength of the mapping. For example, the control mapping score 528 may be a percentage of previous users that implemented the particular template policy that employed the particular proposed control 524. The control mapping score 528 may be a categorization of the affinity between a user-generated policy document 522 and a proposed control 524. For example, the control mapping score 528 may be either "very strong", "strong", "moderate", "weak", or "previously unmatched".

The method of FIG. 5 also includes determining 504, by the security and compliance monitor 200 from a group of template policy documents, a best-matching template policy document 526 for the user-generated policy document 522. Determining 504, from a group of template policy documents, the best-matching template policy document 526 for the user-generated policy document 522 may be carried out by the security and compliance monitor 200 comparing the text of the user-generated policy document 522 to the template policy documents in the group of template policy documents within a template policy document repository 214. The template policy document repository 214 may include a vector database, and each template policy may be vectorized for comparison with the vector database. The user-generated policy document 522 may then also be vectorized and a similarity search may be performed using the vectorized user-generated policy document 522 to determine the best-matching template policy document 526. The term "best-matching" as used herein refers to a template policy document that is more similar to the user-generated policy document 522 than at least some of the other template policy documents to which the user-generated policy document 522 was compared.

The method of FIG. 5 also includes generating 506, by the security and compliance monitor 200, the control mapping score 528 based on previous mappings between the proposed control 524 and the best-matching template policy document 526. Generating 506 the control mapping score 528 based on previous mappings between the proposed control 524 and the best-matching template policy document 526 may be carried out by accessing the group of controls previously mapped to the best-matching template policy document 526. The security and compliance monitor 200 may track the controls that previous users employed for the best-matching template policy document 526. Using the tracking data, the security and compliance monitor 200 may then determine the control mapping score 528 based on usage data about the proposed control 524 for the best-matching template policy document 526.

For example, assume user 1, user 2, and user 3 each have implemented the template privacy policy at each user's respective organization. User 1 employs control A, control B, and control C to verify compliance with the privacy policy. User 2 employs control A, control B, and control D to verify compliance with the privacy policy. User 3 employs control A, control E, and control F to verify compliance with the privacy policy. For the privacy policy, the security and compliance monitor 200 may track control A as a 100% match (3 out of 3 users), control B as a 67% match (2 out of 3 users), and control D, control E, and control F as 30% match (1 out of 3 users). Alternatively, the security and compliance monitor 200 may track control A as a "very strong" match, control B as a "strong" match, and control D, control E, and control F as "weak" matches. If control A is the proposed control, then the control mapping score 528 would be a 100% match or a "strong" match.

The method of FIG. 5 also includes providing 508, by the security and compliance monitor 200 to a user computing system 520, the control mapping score 528 for the proposed control 524 mapped to the user-generated policy document 522. Providing 508, to the user computing system 520, the control mapping score 528 for the proposed control 524 mapped to the user-generated policy document 522 may be carried out by sending the control mapping score 528 and a description of the proposed control 524 to the user computing system 520. The sent message may include a recommendation regarding whether to implement the proposed control 524 (based on the control mapping score 528). The user computing system 520 may be provided with a list of proposed controls along with the control mapping score 528 for each control. Providing 508 the control mapping score 528 for the proposed control 524 may include sending a link or other mechanism to implement the proposed control 524 within the organization. For example, the user of the user computing system 520 may be prompted to grant the security and compliance monitor 200 access to the exposed APIs of the service providers relevant to the proposed control 524.

Providing 508 the control mapping score 528 for the proposed control 524 may include providing a recommendation to employ the proposed control based on a comparison of the control mapping score to a threshold value. Specifically, the security and compliance monitor 200 may retrieve (or derive) the control mapping score 528 from the previous mapping tracking data and compare that value or indication to a minimum or maximum recommendation value. For example, the threshold value may be 29% above which would be a recommended control and below which would not be a recommended control. Along with the proposed control 524 and the control mapping score 528, the user computing system 520 may be provided with either an indication that the control is recommended for use with the user-generated policy document 522 or an indication that the control is not recommended for use with the user-generated policy document 522 based on the threshold comparison.

The above steps improve the operation of the computer system by allowing a user to submit an original policy to the security and compliance monitor 200 and receive a control mapping score for a proposed control for that policy. This is accomplished by determining a best-matching template policy and generating the control mapping score based on whether and how frequently the proposed control has been used for the best-matching template policy by other users.

Figure 6:
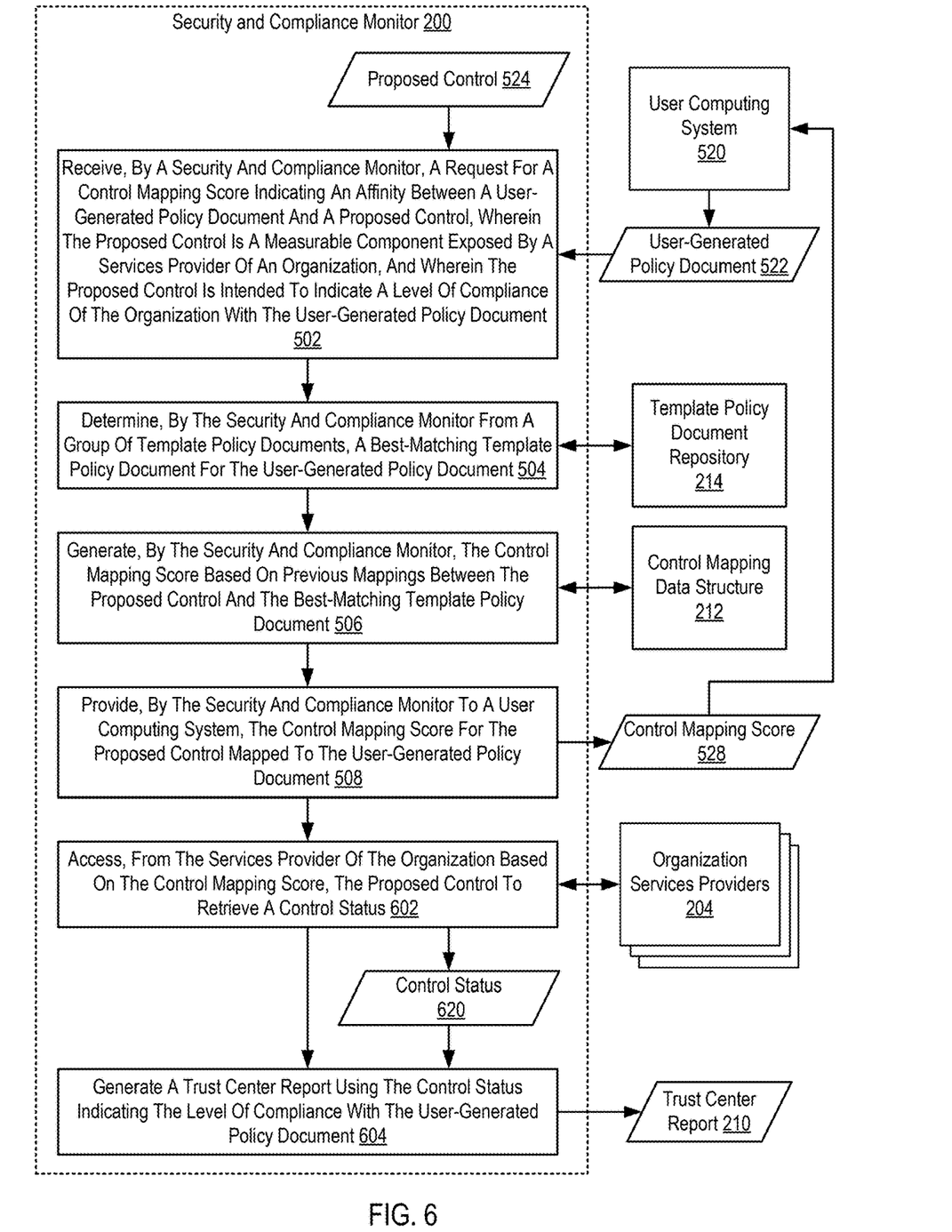
FIG. 6 sets forth a flow chart illustrating an exemplary method for categorizing policy-based control mapping for real-time security and compliance monitoring according to embodiments of the present invention.

For further explanation, FIG. 6 sets forth a flow chart illustrating a further exemplary method for a categorizing policy-based control mapping for real-time security and compliance monitoring according to embodiments of the present invention that includes receiving 502, by a security and compliance monitor 200, a request for a control mapping score indicating an affinity between a user-generated policy document 522 and a proposed control 524, wherein the proposed control 524 is a measurable component exposed by a services provider of an organization, and wherein the proposed control 524 is intended to indicate a level of compliance of the organization with the user-generated policy document 522; determining 504, by the security and compliance monitor 200 from a group of template policy documents, a best-matching template policy document 526 for the user-generated policy document 522; generating 506, by the security and compliance monitor 200, the control mapping score 528 based on previous mappings between the proposed control 524 and the best-matching template policy document 526; and providing 508, by the security and compliance monitor 200 to a user computing system 520, the control mapping score 528 for the proposed control 524 mapped to the user-generated policy document 522.

The method of FIG. 6 differs from the method of FIG. 5, however, in that the method of FIG. 6 further includes accessing 602, from the services provider 204 of the organization based on the control mapping score 528, the proposed control 524 to retrieve a control status 620. Accessing 602 the proposed control 524 based on the control mapping score 528 may be carried out by determining whether the control mapping score 528 for the proposed control 524 is within a range acceptable to employ that control. For example, the security and compliance monitor may verify that the control mapping score 528 is at least 29% before employing the control for the user-generated policy document 522. Once the control mapping score 528 is determined to be acceptable, the security and compliance monitor 200 may issue a control status request to the organization services provider and receiving, in response, the control status response. The control status request may be commands submitted via a command line interface exposed by the organization services provider. The control status responses may be state specifications provided in response to the submitted commands.

Accessing 602 the proposed control 524 based on the control mapping score 528 may be carried out periodically. Specifically, each control status response may be retrieved at the expiration of a period of time set for each control status. The period of time may be different for each control status and may be based on various factors, including, for example, the severity of failing the control, historical data indicating frequency of failure events, and system efficiency.

Once the control status response is retrieved, the control status may then be determined. Determining the control status for the proposed control 524 based on the control status responses may be carried out by translating the control status responses into a control status 620 for the proposed control 524 within the trust center report 210. Specifically, the control status response may include additional information unrelated to the individual control status 620. Further, the control status responses may not succinctly indicate the control status of the proposed control 524. Consequently, the security and compliance monitor 200 may perform various operations on the control status responses in order to extract the control status 620. For example, the security and compliance monitor 200 may compare elements in a control status response to a value (such as a minimum or maximum value allowed) to determine the control status for the control.

For example, for one control status, the security and compliance monitor 200 may generate a command requesting the frequency of data backups performed on a particular data set. The security and compliance monitor 200 may then send the command to a cloud services provider via a command line interface. In response, the security and compliance monitor 200 may receive a state specification detailing that the particular data set is backed up once a day. The security and compliance monitor 200 may then extract the frequency of once a day from the control status response and compare that value with the minimum value for the control. If the frequency of once a day is at least as frequent as required by the trust center report, then the control status for that control would be "in compliance".

The method of FIG. 6 also includes generating 604 a trust center report 210 using the control status 620 indicating the level of compliance with the user-generated policy document 522. Generating 604 a trust center report 210 using the control status 620 may be carried out by identifying the control status indicators corresponding to the control status 620. The control status indicators and the control identifiers may then be organized into the trust center report 210.

Figure 7:
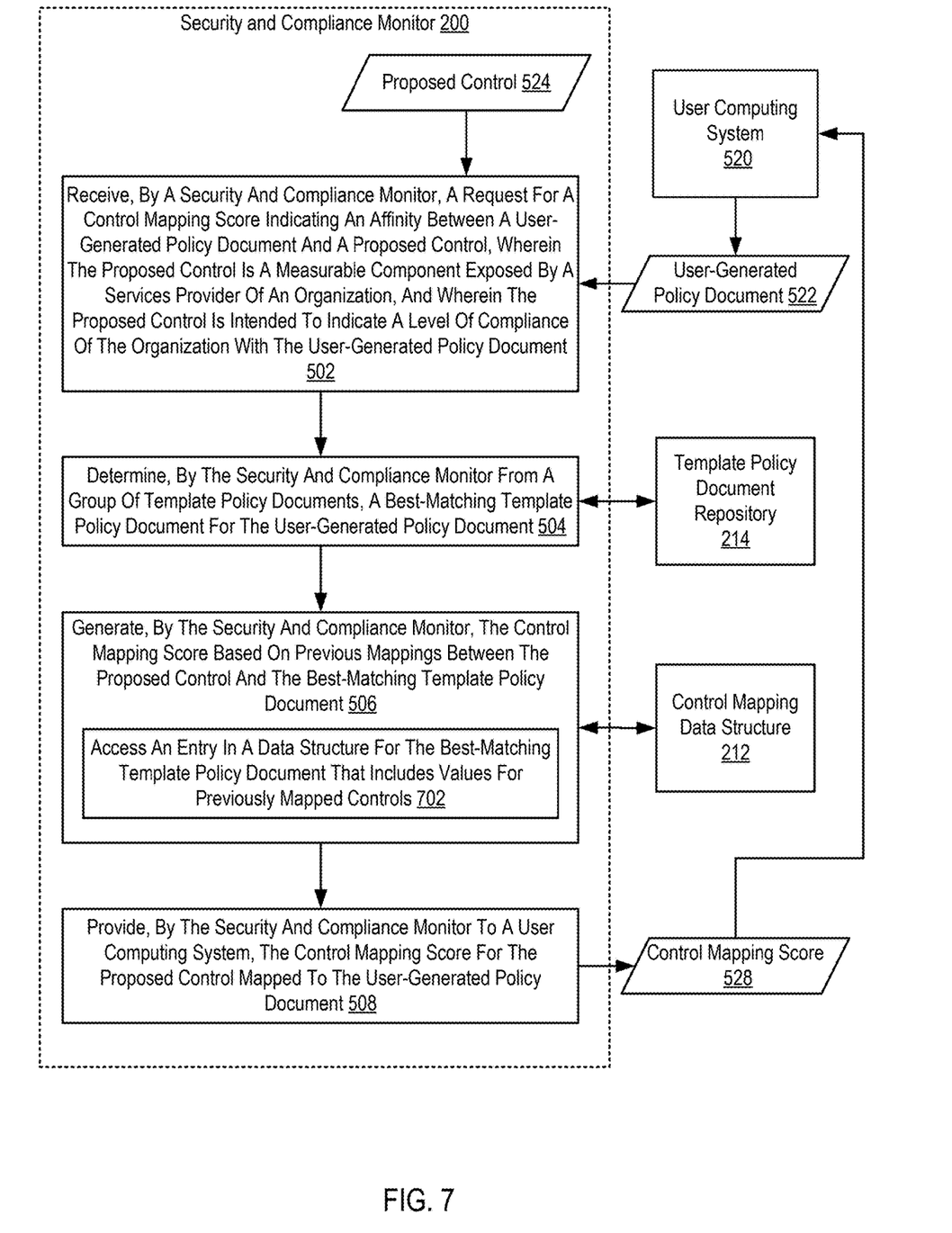
FIG. 7 sets forth a flow chart illustrating an exemplary method for categorizing policy-based control mapping for real-time security and compliance monitoring according to embodiments of the present invention.

For further explanation, FIG. 7 sets forth a flow chart illustrating a further exemplary method for a categorizing policy-based control mapping for real-time security and compliance monitoring according to embodiments of the present invention that includes receiving 502, by a security and compliance monitor 200, a request for a control mapping score indicating an affinity between a user-generated policy document 522 and a proposed control 524, wherein the proposed control 524 is a measurable component exposed by a services provider of an organization, and wherein the proposed control 524 is intended to indicate a level of compliance of the organization with the user-generated policy document 522; determining 504, by the security and compliance monitor 200 from a group of template policy documents, a best-matching template policy document 526 for the user-generated policy document 522; generating 506, by the security and compliance monitor 200, the control mapping score 528 based on previous mappings between the proposed control 524 and the best-matching template policy document 526; and providing 508, by the security and compliance monitor 200 to a user computing system 520, the control mapping score 528 for the proposed control 524 mapped to the user-generated policy document 522.

The method of FIG. 7 differs from the method of FIG. 5, however, in that generating 506, by the security and compliance monitor 200, the control mapping score 528 based on previous mappings between the proposed control 524 and the best-matching template policy document 526 includes accessing 702 an entry in a data structure 212 for the best-matching template policy document that includes values for previously mapped controls. Accessing 702 an entry in the data structure 212 for the best-matching template policy document that includes values for previously mapped controls may be carried out by using the best-matching template policy document as key into the data structure 212 to retrieve the corresponding entries for the controls employed for the best-matching template policy document. As discussed above, the entries for controls mapped to the best-matching template policy document may include values that indicate a frequency that the particular control has been mapped to the template policy document by other users.

Once an entry for the proposed control in the control mapping data structure 212 has been retrieved, additional data and/or processing may be required to generate the control mapping score 528. For example, the value stored in the data structure 212 may be a value indicating the number of times that the control has been employed for the template policy document. In order to calculate the control mapping score 528, the security and compliance monitor 200 may determine the total number of times the template policy document has been employed and use the total number to determine a percentage of uses that included the proposed control.

Advantages and features of the present disclosure can be further described by the following statements:

1. A method of receiving, by a security and compliance monitor, a request for a control mapping score indicating an affinity between a user-generated policy document and a proposed control, wherein the proposed control is a measurable component exposed by a services provider of an organization, and wherein the proposed control is intended to indicate a level of compliance of the organization with the user-generated policy document; determining, by the security and compliance monitor from a group of template policy documents, a best-matching template policy document for the user-generated policy document; generating, by the security and compliance monitor, the control mapping score based on previous mappings between the proposed control and the best-matching template policy document; and providing, by the security and compliance monitor to a user computing system, the control mapping score for the proposed control mapped to the user-generated policy document.

2. The method of statement 1, further comprising: accessing, from the services provider of the organization based on the control mapping score, the proposed control to retrieve a control status; and generating a trust center report using the control status indicating the level of compliance with the user-generated policy document.

3. The method of statement 2 or statement 1, wherein generating the control mapping score based on the previous mappings between the proposed control and the best-matching template policy document comprises accessing an entry in a data structure for the best-matching template policy document that includes values for previously mapped controls.

4. The method of statement 3, statement 2, or statement 1, wherein each value for previously mapped controls in the data structure indicates a frequency that each previously mapped control has been mapped to a template policy document by other users.

5. The method of statement 4, statement 3, statement 2, or statement 1, wherein determining, from the group of template policy documents, the best-matching template policy document for the user-generated policy document comprises matching the user-generated policy document to the best-matching template policy document using a vector database.

6. The method of statement 5, statement 4, statement 3, statement 2, or statement 1, wherein the proposed control is identified by matching language within the user-generated policy document to a stock control language record describing the proposed control.

7. The method of statement 6, statement 5, statement 4, statement 3, statement 2, or statement 1, wherein providing, to the user computing system, the control mapping score for the proposed control mapped to the user-generated policy document comprises providing a recommendation to employ the proposed control based on a comparison of the control mapping score to a threshold value.

8. The method of statement 7, statement 6, statement 5, statement 4, statement 3, statement 2, or statement 1, wherein the best-matching template policy document is a privacy policy document.

9. The method of statement 8, statement 7, statement 6, statement 5, statement 4, statement 3, statement 2, or statement 1, wherein at least one of the services providers of the organization comprise a cloud services provider.

10. The method of statement 9, statement 8, statement 7, statement 6, statement 5, statement 4, statement 3, statement 2, or statement 1, wherein the user-generated policy document comprises a plurality of obligations assigned to the organization.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:
receiving, by a security and compliance monitor, a request for a control mapping score indicating an affinity between a user-generated policy document and a proposed control, wherein the proposed control is a measurable component exposed by a services provider of an organization, and wherein the proposed control is intended to indicate a level of compliance of the organization with the user-generated policy document;
determining, by the security and compliance monitor from a group of template policy documents, a best-matching template policy document for the user-generated policy document;
generating, by the security and compliance monitor, the control mapping score based on previous mappings between the proposed control and the best-matching template policy document; and
providing, by the security and compliance monitor to a user computing system, the control mapping score for the proposed control mapped to the user-generated policy document.

2. The method of claim 1, further comprising:
accessing, from the services provider of the organization based on the control mapping score, the proposed control to retrieve a control status; and
generating a trust center report using the control status indicating the level of compliance with the user-generated policy document.

3. The method of claim 1, wherein generating the control mapping score based on the previous mappings between the proposed control and the best-matching template policy document comprises accessing an entry in a data structure for the best-matching template policy document that includes values for previously mapped controls.

4. The method of claim 3, wherein each value for previously mapped controls in the data structure indicates a frequency that each previously mapped control has been mapped to a template policy document by other users.

5. The method of claim 1, wherein determining, from the group of template policy documents, the best-matching template policy document for the user-generated policy document comprises matching the user-generated policy document to the best-matching template policy document using a vector database.

6. The method of claim 1, wherein the proposed control is identified by matching language within the user-generated policy document to a stock control language record describing the proposed control.

7. The method of claim 1, wherein providing, to the user computing system, the control mapping score for the proposed control mapped to the user-generated policy document comprises providing a recommendation to employ the proposed control based on a comparison of the control mapping score to a threshold value.

8. The method of claim 1, wherein the best-matching template policy document is a privacy policy document.

9. The method of claim 1, wherein at least one of the services providers of the organization comprise a cloud services provider.

10. The method of claim 1, wherein the user-generated policy document comprises a plurality of obligations assigned to the organization.

11. A system comprising:
a memory; and
a processing device, operatively coupled to the memory, the processing device configured to:
receive a request for a control mapping score indicating an affinity between a user-generated policy document and a proposed control, wherein the proposed control is a measurable component exposed by a services provider of an organization, and wherein the proposed control is intended to indicate a level of compliance of the organization with the user-generated policy document;
determine, from a group of template policy documents, a best-matching template policy document for the user-generated policy document;
generate the control mapping score based on previous mappings between the proposed control and the best-matching template policy document; and
provide, to a user computing system, the control mapping score for the proposed control mapped to the user-generated policy document.

12. The system of claim 11, wherein the processing device is further configured to:
accessing, from the services provider of the organization based on the control mapping score, the proposed control to retrieve a control status; and
generating a trust center report using the control status indicating the level of compliance with the user-generated policy document.

13. The system of claim 11, wherein generating the control mapping score based on the previous mappings between the proposed control and the best-matching template policy document comprises accessing an entry in a data structure for the best-matching template policy document that includes values for previously mapped controls.

14. The system of claim 13, wherein each value for previously mapped controls in the data structure indicates a frequency that each previously mapped control has been mapped to a template policy document by other users.

15. The system of claim 11, wherein determining, from the group of template policy documents, the best-matching template policy document for the user-generated policy document comprises matching the user-generated policy document to the best-matching template policy document using a vector database.

16. The system of claim 11, wherein the proposed control is identified by matching language within the user-generated policy document to a stock control language record describing the proposed control.

17. The system of claim 11, wherein providing, to the user computing system, the control mapping score for the proposed control mapped to the user-generated policy document comprises providing a recommendation to employ the proposed control based on a comparison of the control mapping score to a threshold value.

18. The system of claim 11, wherein the best-matching template policy document is a privacy policy document.

19. The system of claim 11, wherein at least one of the services providers of the organization comprise a cloud services provider.

20. A non-transitory computer readable storage medium storing instructions which, when executed, cause a processing device to:
receive a request for a control mapping score indicating an affinity between a user-generated policy document and a proposed control, wherein the proposed control is a measurable component exposed by a services provider of an organization, and wherein the proposed control is intended to indicate a level of compliance of the organization with the user-generated policy document;
determine, from a group of template policy documents, a best-matching template policy document for the user-generated policy document;
generate the control mapping score based on previous mappings between the proposed control and the best-matching template policy document; and
provide, to a user computing system, the control mapping score for the proposed control mapped to the user-generated policy document.

* * * * *